(12) United States Patent
Koenen et al.

(10) Patent No.: US 10,871,110 B2
(45) Date of Patent: Dec. 22, 2020

(54) ENGINE GOVERNOR

(71) Applicant: Briggs & Stratton Corporation, Wauwatosa, WI (US)

(72) Inventors: Robert Koenen, Pewaukee, WI (US); Daniel Brueck, Brookfield, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 94 days.

(21) Appl. No.: 15/875,712

(22) Filed: Jan. 19, 2018

(65) Prior Publication Data

US 2018/0142628 A1 May 24, 2018

Related U.S. Application Data

(62) Division of application No. 14/702,435, filed on May 1, 2015, now Pat. No. 9,909,511.

(Continued)

(51) Int. Cl.
*F02D 9/00* (2006.01)
*F02D 9/02* (2006.01)
(Continued)

(52) U.S. Cl.
CPC ............ *F02D 9/02* (2013.01); *F02D 9/1065* (2013.01); *F02D 11/10* (2013.01); *F02D 31/002* (2013.01); *F02D 41/1402* (2013.01); *F02P 9/005* (2013.01); *F16H 35/00* (2013.01); *F02D 2009/022* (2013.01); *F02D 2009/023* (2013.01); *F02D 2009/0208* (2013.01);
(Continued)

(58) Field of Classification Search
CPC ........ F02D 9/02; F02D 9/1065; F02D 31/002; F02D 2200/1004; F02D 2200/0404; F02D 2200/101; F02D 2400/14; F02D 11/10; F02D 2009/0261; F02D 2009/023; F02D 2009/022; F02D 2009/0213; F02D 2009/0208; F02D 41/1402; F16H 35/00; F16H 2035/003; F16H 2035/005; F02P 9/005; Y10T 74/18568
See application file for complete search history.

(56) References Cited

U.S. PATENT DOCUMENTS 1,788,953 A 1/1931 Keilholz
2,778,953 A 1/1957 Torre et al.
(Continued)

FOREIGN PATENT DOCUMENTS

DE 19929927 A1 1/2001
EP 1 288 470 A2 3/2003
(Continued)

OTHER PUBLICATIONS

PCT Written Opinion, PCT/US2015/028825, Briggs & Stratton Corporation, dated Jul. 24, 2015.

*Primary Examiner* — Phutthiwat Wongwian
*Assistant Examiner* — Sherman D Manley
(74) *Attorney, Agent, or Firm* — Foley & Lardner LLP

(57) ABSTRACT

An electronic governor system includes a motor, a transmission coupled to the motor, a throttle plate coupled to the transmission, the throttle plate movable to multiple positions between closed and wide-open, wherein power is supplied to the motor to move the throttle pate to a desired position and wherein power is not supplied to the motor to maintain the throttle plate in the desired position.

11 Claims, 7 Drawing Sheets

Related U.S. Application Data

(60) Provisional application No. 61/987,350, filed on May 1, 2014, provisional application No. 62/081,221, filed on Nov. 18, 2014.

(51) Int. Cl.
*F16H 35/00* (2006.01)
*F02D 41/14* (2006.01)
*F02P 9/00* (2006.01)
*F02D 11/10* (2006.01)
*F02D 31/00* (2006.01)
*F02D 9/10* (2006.01)

(52) U.S. Cl.
CPC ........... *F02D 2009/0213* (2013.01); *F02D 2009/0261* (2013.01); *F02D 2200/0404* (2013.01); *F02D 2200/101* (2013.01); *F02D 2200/1004* (2013.01); *F02D 2400/14* (2013.01); *F16H 2035/003* (2013.01); *F16H 2035/005* (2013.01); *Y10T 74/18568* (2015.01)

(56) References Cited

U.S. PATENT DOCUMENTS

| | | | |
|---|---|---|---|
| 2,902,606 A | 9/1959 | Carlsson | |
| 3,114,851 A | 12/1963 | Santi | |
| 3,527,266 A | 9/1970 | Santi | |
| 4,307,690 A | 12/1981 | Rau et al. | |
| 4,409,940 A | 10/1983 | Gaus | |
| 4,453,517 A | 6/1984 | Kasiewicz | |
| 4,523,561 A | 6/1985 | Kosuge | |
| 4,523,564 A | 6/1985 | Sturdy | |
| 4,768,483 A | 9/1988 | Asayama | |
| 4,930,594 A | 6/1990 | Koshizawa et al. | |
| 5,003,948 A | 4/1991 | Churchill et al. | |
| 5,010,312 A | 4/1991 | Motykiewicz | |
| 5,287,835 A * | 2/1994 | Fiorenza, II | F02D 9/02 |
| | | | 123/352 |
| 5,524,588 A | 6/1996 | Dykstra et al. | |
| 5,605,130 A | 2/1997 | Dykstra et al. | |
| 5,630,384 A | 5/1997 | Mottier et al. | |
| 5,704,338 A | 1/1998 | Andersson et al. | |
| 6,320,285 B1 | 11/2001 | Ito et al. | |
| 6,390,061 B1 | 5/2002 | Melville et al. | |
| 6,915,777 B2 * | 7/2005 | Fukushima | F02D 31/002 |
| | | | 123/335 |
| 7,085,645 B2 | 8/2006 | Matsuda et al. | |
| 7,124,015 B2 | 10/2006 | Mizuno et al. | |
| 7,191,583 B2 | 3/2007 | Fukushima et al. | |
| 7,357,755 B2 | 4/2008 | Fukushima et al. | |
| 7,554,213 B2 | 6/2009 | Kawakami et al. | |
| 7,612,460 B2 * | 11/2009 | Kamimura | F02D 29/06 |
| | | | 290/40 C |
| 7,673,402 B2 | 3/2010 | Wakitani et al. | |
| 7,744,503 B2 * | 6/2010 | Kobayashi | F02D 9/02 |
| | | | 477/107 |
| 7,854,216 B2 | 12/2010 | Kasai et al. | |
| 8,257,226 B2 | 9/2012 | Reynolds | |
| 8,347,858 B2 * | 1/2013 | Shimamura | F02D 29/04 |
| | | | 123/350 |
| 8,489,310 B2 | 7/2013 | Shimamura et al. | |
| 8,903,634 B2 | 12/2014 | Bungo | |
| 9,909,511 B2 * | 3/2018 | Koenen | F02D 9/02 |
| 2003/0209227 A1 | 11/2003 | Muraji | |
| 2004/0040765 A1 * | 3/2004 | Satou | F02D 31/002 |
| | | | 180/170 |
| 2005/0045148 A1 | 3/2005 | Katsuragawa et al. | |
| 2005/0205073 A1 | 9/2005 | Fuller | |
| 2006/0037574 A1 | 2/2006 | Matsuda et al. | |
| 2007/0151544 A1 * | 7/2007 | Arai | F02D 31/003 |
| | | | 123/376 |
| 2009/0101390 A1 * | 4/2009 | Kimata | H01L 21/565 |
| | | | 174/250 |
| 2009/0120409 A1 * | 5/2009 | Sawut | F02D 31/002 |
| | | | 123/399 |
| 2010/0180864 A1 | 7/2010 | Maekawa et al. | |
| 2012/0000442 A1 * | 1/2012 | Takigawa | F02D 31/002 |
| | | | 123/399 |
| 2015/0059693 A1 * | 3/2015 | Goho | F02D 31/002 |
| | | | 123/399 |
| 2017/0044999 A1 * | 2/2017 | Wang | F02D 41/0002 |
| 2017/0268447 A1 * | 9/2017 | Surnilla | F02D 41/1458 |

FOREIGN PATENT DOCUMENTS

| | | |
|---|---|---|
| JP | 60-240835 A | 11/1985 |
| JP | 02-267333 A | 11/1990 |
| WO | WO 2001/329618 A1 | 4/2001 |

* cited by examiner

ENGINE GOVERNOR

CROSS-REFERENCE TO RELATED APPLICATIONS

This application is a divisional of U.S. patent application Ser. No. 14/702,435 filed May 1, 2015, which claims the benefit of U.S. Provisional Application No. 62/081,221, filed Nov. 18, 2014 and U.S. Provisional Application No. 61/987,350, filed May 1, 2014, all of which are incorporated herein by reference in their entireties.

BACKGROUND

The present invention relates generally to the field of electronic governors, and more particularly to electronic governors for small engines. A typical electronic governor controls engine speed by controlling throttle plate position with a stepper motor.

SUMMARY

One embodiment of the invention relates to an electronic governor system including a motor, a transmission coupled to the motor, a throttle plate coupled to the transmission, an engine speed sensor, and a controller including a feedback control module and an adaptive control module. The throttle plate is movable to a plurality of positions between closed and wide-open. The feedback control module is configured to determine an engine speed error based on a comparison of a current engine speed input signal from the engine speed sensor and a desired engine speed and provide an engine speed output signal to the motor to control the position of the throttle plate to correct the engine speed error. The engine speed output signal is determined by a control algorithm using the engine speed error as an input. The adaptive control module is configured to determine an expected engine speed error correction based on the engine speed output signal provided by the feedback control module, determine an actual engine speed error correction based on a current engine speed input signal from the engine speed sensor and a previous engine speed input signal from the engine speed sensor, determine a correction error based on the expected engine speed error correction and the actual engine speed correction, and adjust a parameter of the control algorithm of the feedback control module when the correction error is within a predetermined range or outside of a predetermined range.

Another embodiment of the invention relates to a four-cycle small internal combustion engine including an engine speed sensor configured to detect an engine speed, an electronic governor system configured to change an engine operating speed in response to a load input, and a load sensing system configured to determine an engine load based on changes in the detected engine speed and provide the load input to the electronic governor system based on the determined engine load.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which.

DETAILED DESCRIPTION

Figure 1:
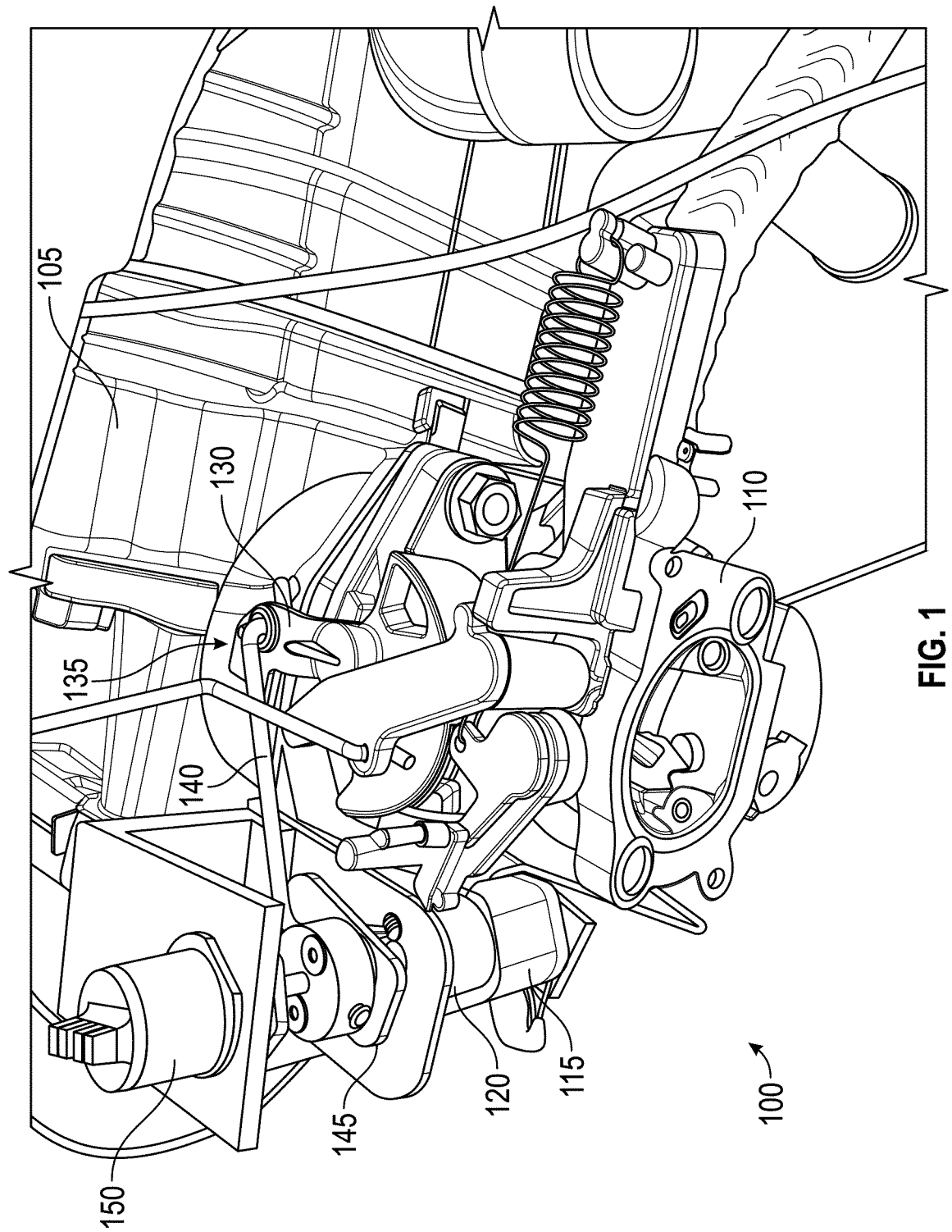
FIG. 1 is a perspective view of a portion of an internal combustion engine including an electronic governor system according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to FIGS. 1-2 and 4-5, an electronic governor system is illustrated according to an exemplary embodiment. The electronic governor system 100 is shown in use on a small engine 105. The electronic governor system 100 includes a carburetor 110, a motor 115 (e.g., a direct current ("DC") motor), a transmission 120, a throttle plate 125, a throttle lever 130 and a linkage 135 connecting the throttle lever to the transmission. In the carburetor 110, fuel is mixed with air to produce an air/fuel mixture for combustion in one or more cylinders of the engine 105. The throttle plate 125 controls the flow of the air/fuel mixture out of the carburetor 110 and in doing so controls the speed of the engine 105. As illustrated, the linkage 135 includes a link 140 and a crank arm 145. In some embodiments the electronic governor system 100 also includes an encoder 150 that is coupled to the motor 115 and the transmission 120.

The motor assembly (i.e., the motor 115 and the transmission 120) is used to control the position of the throttle plate 125, thereby controlling the engine speed. The throttle plate 125 is movable between a closed position and a wide-open position. The position of the throttle plate 125 is adjusted so that the engine speed is maintained at a desired engine speed. The desired engine speed can be a constant or can be varied by a user or a controller in response to inputs from the engine (e.g., inputs related to engine load, desired output, or other engine operating conditions or objectives).

The motor 115 is relatively low cost, particularly with respect to the stepper motor typically used in other electronic governor systems. The motor 115 does not track steps of the motor's rotation like a stepper motor. In some embodiments, the motor 115 is a brushed motor. The transmission 120 provides a large reduction ratio (i.e., input speed/output speed). For example, the motor 115 may have a top speed of 4,000 revolutions per minute (rpm). The transmission 120 may provide a reduction so that the output from the transmission turns at 100 rpm (i.e., a 40:1 reduction ratio). This will result in a transmission output speed that is relatively fast as compared to the amount of rotation necessary to adjust the throttle plate position (e.g., 75 to 100 rpm), with the throttle plate's range of motion (i.e., between the closed position and the wide-open position) being less than a full revolution, and produces a relatively large amount of torque. At this relatively fast transmission output speed the throttle plate 125 is able to move from closed to wide open in about 40 milliseconds. As another example, the motor 115 may have an output speed of at about 10,000 rpm and the transmission may provide a gear reduction such that the output of the transmission is about 60 rpm (i.e. a reduction ratio of about 167:1). In some embodiments, the transmission 120 is a series of gears that provides a reduction from the input of the motor to the output of the transmission. The transmission 120 providing a large reduction ratio produces an output from the transmission 120 with a relatively large amount of torque. The output shaft of the transmission 120 only needs to rotate a small amount to adjust the throttle plate position within the throttle plate's range of motion and in doing so is able to produce a lot of torque. Another advantage of this large reduction ratio is that power only needs to be supplied to the motor 115 when moving the output shaft of the transmission 120 to the desired position. This position corresponds with the desired position of the throttle plate 125. After the output shaft of the transmission 120, and therefore the throttle plate 125, has reached the desired position, the motor 115 is no longer powered (i.e., the motor 115 is turned off). In this way, power is not needed to maintain the position of the output shaft of the transmission 120 and of the throttle plate 125. The relatively large reduction ratio provided by the transmission 120 is able to maintain or hold the throttle plate 125 in position without power being supplied to the motor 115 to maintain the desired position of the throttle plate 125. In some embodiments several components of the electronic governor system 100 are included within a single housing. For example, the motor 115 and the transmission 120 could form a single unit. This unit may be combined with the controller 155 and its associated circuit board.

As shown in FIG. 1, the linkage 135 connects the output shaft of the transmission 120 to the throttle lever 130. The throttle lever 130 is connected to the throttle plate 125, such that the motor 115 drives the transmission 120 which moves the linkage 135 which moves the throttle lever 130 which moves the throttle plate 125. In this way, powering the motor 115 causes the throttle plate 125 to change position. Though the linkage 135 is shown as a two-piece linkage, other appropriate mechanisms for connecting the output shaft of the transmission 120 to the throttle plate 125 may be utilized. For example, the output shaft of the transmission 120 could be directly connected to the throttle plate 125 or one or more components could be used to connect the output shaft of the transmission 120 to the throttle plate 125. In some embodiments, one or more gears are used to connect the output shaft of the transmission 120 to the throttle plate 125.

In some embodiments, the encoder 150 is connected to the motor 115 and the transmission 120 to determine the position of the output shaft of the transmission 120. In some embodiments, the encoder 150 is an absolute encoder and can be used to keep track of the position of the output shaft of the transmission 120 and therefore the position of the throttle plate 125.

Figure 2:
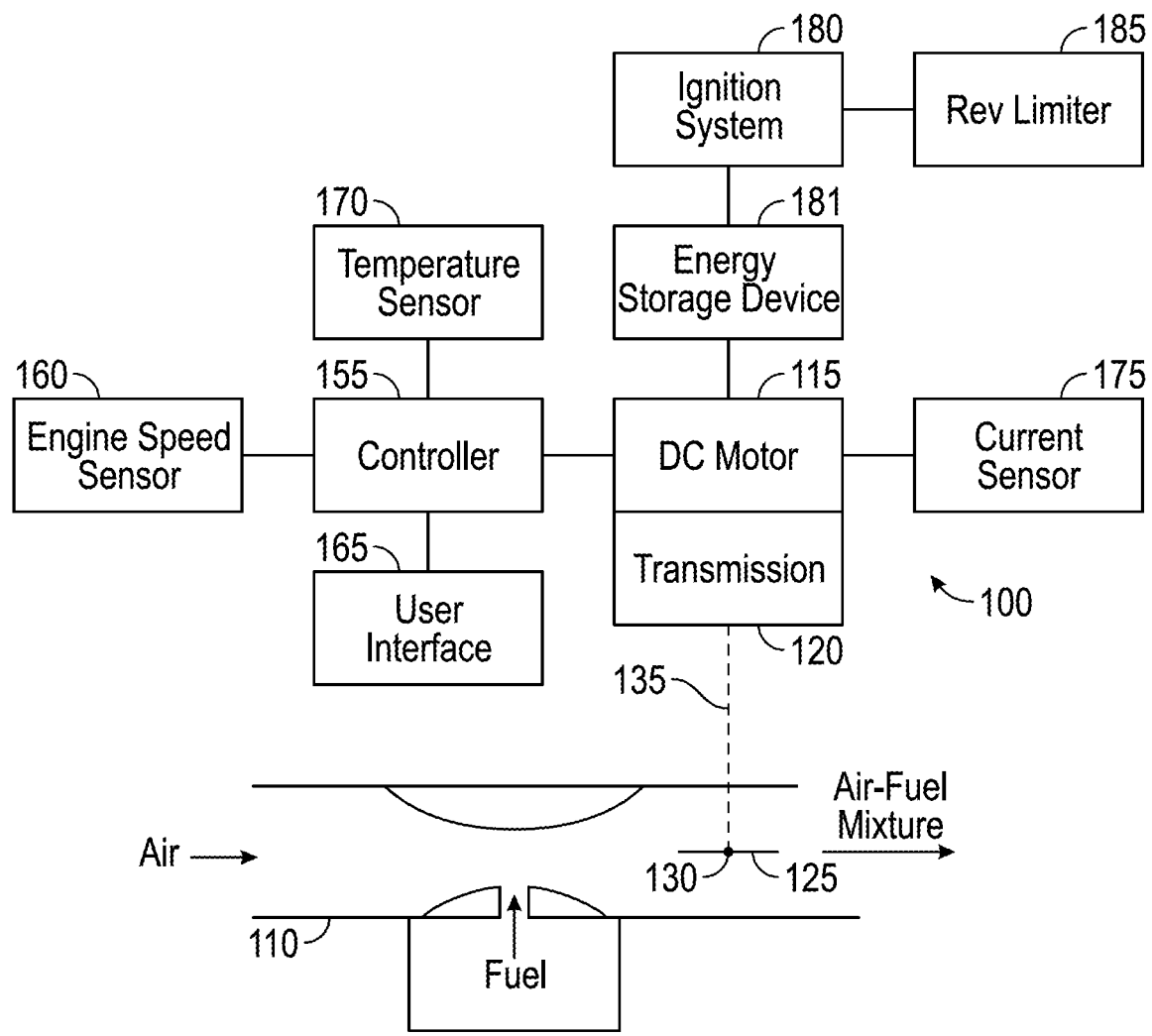
FIG. 2 is a schematic representation of an electronic governor system according to an exemplary embodiment.

As shown in FIG. 2, the electronic governor system 100 includes a controller 155 that controls the operation of the motor 115. In some embodiments, the controller 155 also controls the operation of other components of the electronic governor system 100 that will be described in more detail below. These components may include an engine speed sensor 160, a user interface 165, a temperature sensor 170, a current sensor 175, an ignition system 180, and a rev limiter 185. Different embodiments of the electronic governor system 100 may include some, none or all of these additional components.

Figure 3:
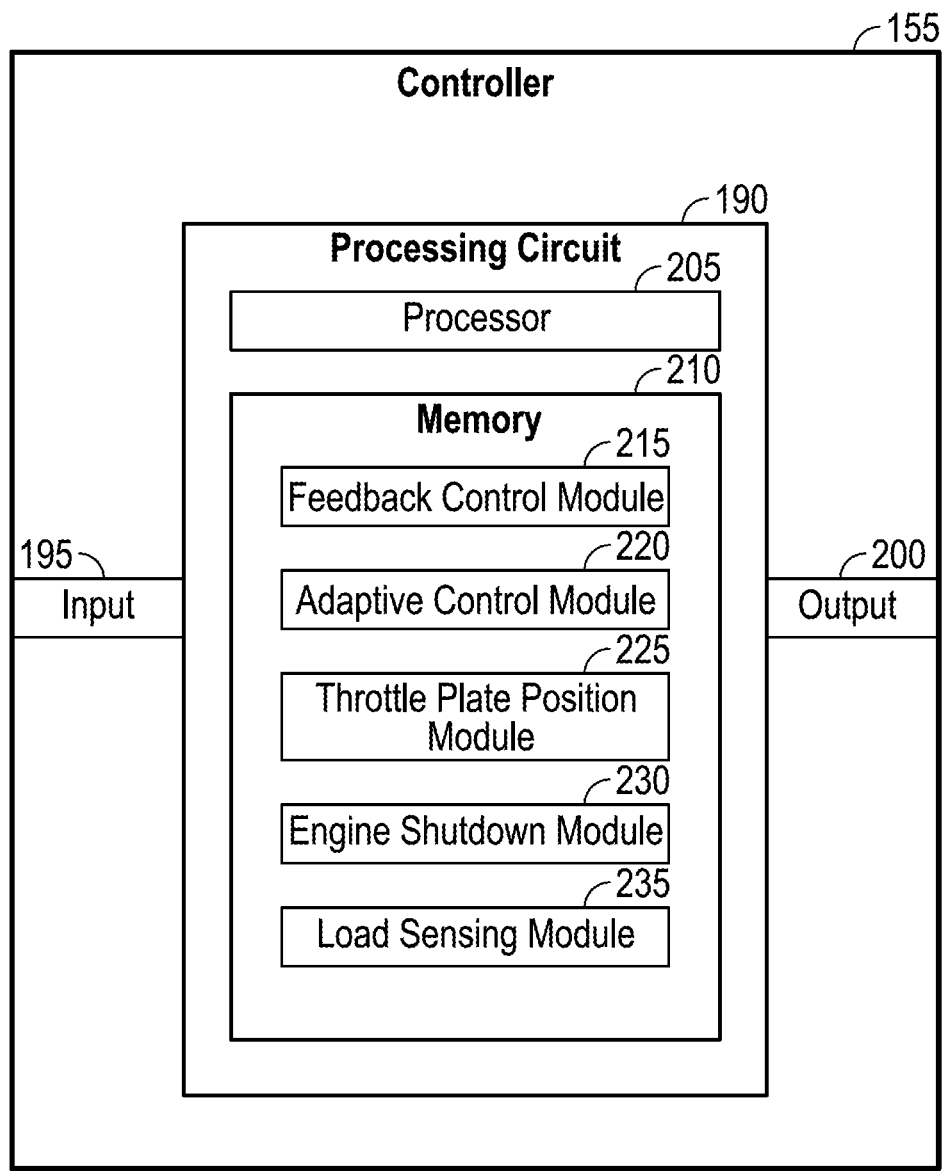
FIG. 3 is a block diagram of the controller of an electronic governor system according to an exemplary embodiment.
Figure 4:
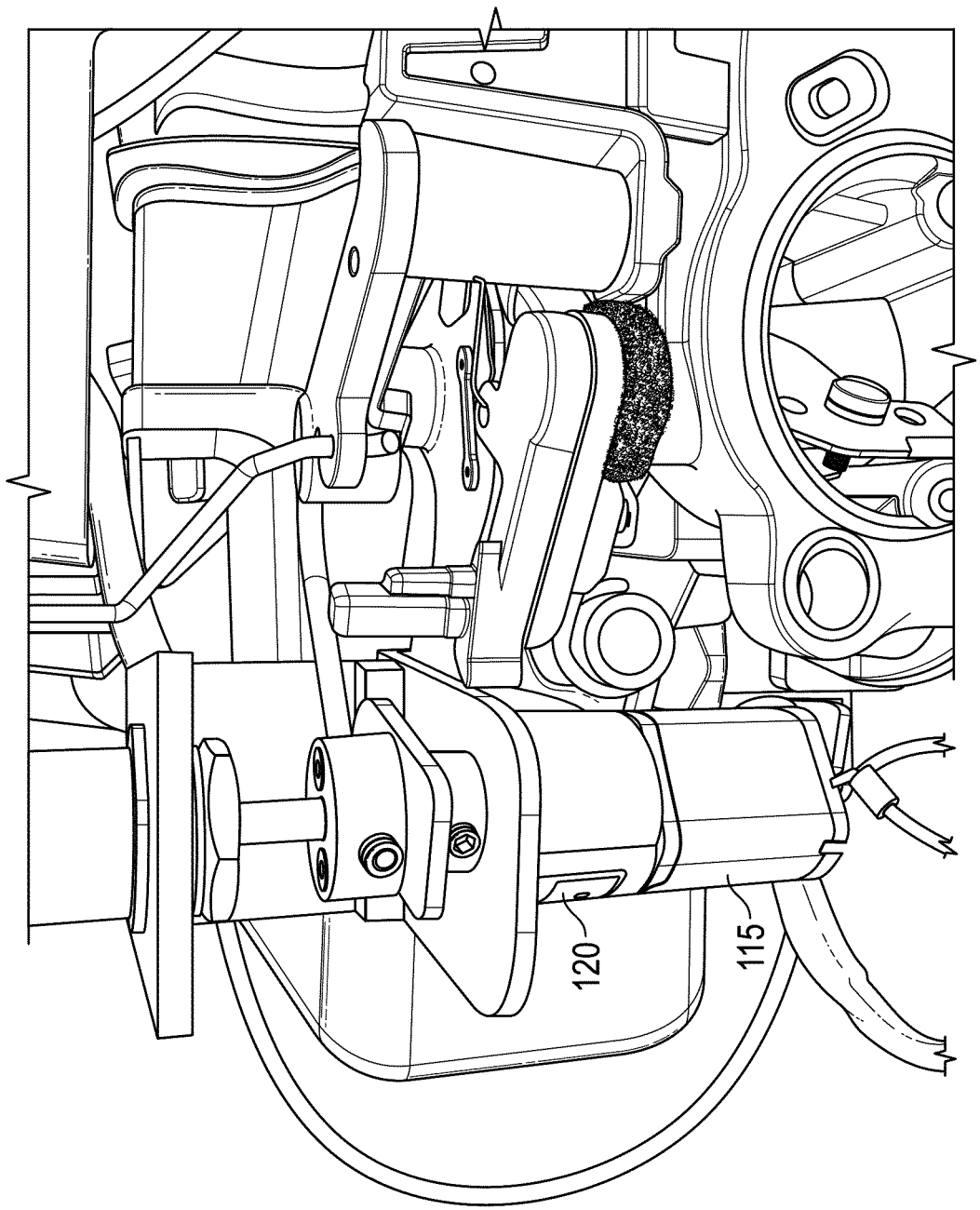
FIG. 4 is a perspective view of a portion of the internal combustion engine of FIG. 1 including the electronic governor system.
Figure 5:
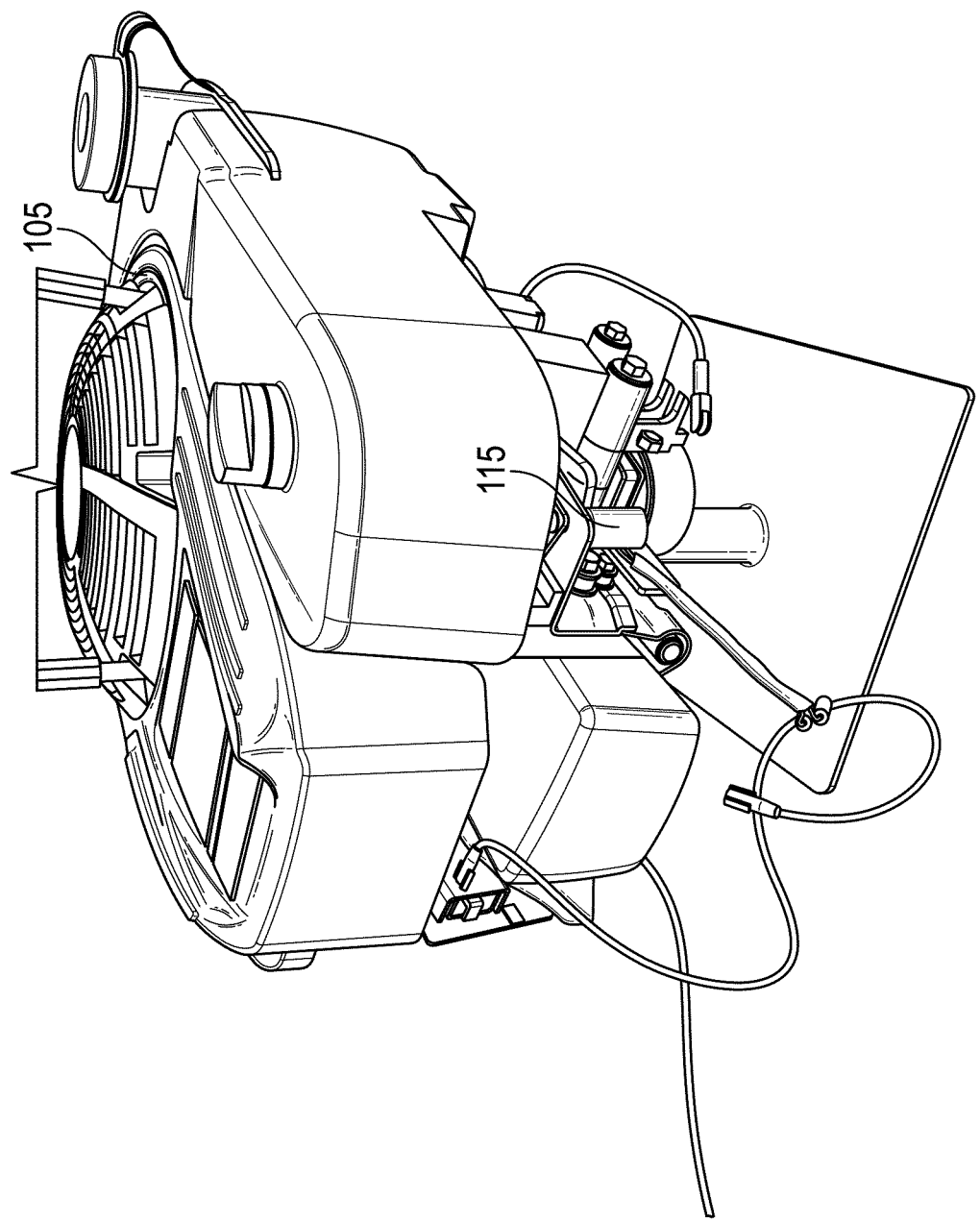
FIG. 5 is a perspective view of the internal combustion engine of FIG. 1 including the electronic governor system.

As shown in FIG. 3, the controller 155 includes a processing circuit 190, an input interface 195, and an output interface 200. The processing circuit 190 includes a processor 205 and memory 210. The processing circuit 190 and processor 205 are configured to receive inputs from input interface 195 (e.g., via a wired or wireless communication link with other components of the engine and/or electronic governor system) and to provide an output (e.g., a control signal, an actuator output, etc.) via output interface 200 (e.g., via a wired or wireless communication link to the motor 115, other components of the engine, and/or other components of the electronic governor system). The processing circuit 190 can be a circuit containing one or more processing components (e.g., the processor 205) or a group of distributed processing components. The processor 205 may be a general purpose or specific purpose processor configured to execute computer code or instructions stored in the memory or received from other computer readable media (e.g., CD-ROM, network storage, a remote server, etc.). The processing circuit 190 is also shown to include the memory 210. Memory 210 may be RAM, hard drive storage, temporary storage, non-volatile memory, flash memory, optical memory, or any other suitable memory for storing software objects and/or computer instructions. When the processor 205 executes instructions stored in the memory 210 for completing the various activities described herein, the processor 205 generally configures the computer system and more particularly the processing circuit 190 to complete such activities. The memory 210 may include database components, object code components, script components, and/or any other type of information structure for supporting the various activities described in the present disclosure. For example, the memory 210 may store data regarding the operation of a controller (e.g., previous setpoints, previous behavior patterns regarding used energy to adjust a current value to a setpoint, etc.). According to an exemplary embodiment, the memory 210 is communicably connected to the processor 205 and includes computer code for executing one or more processes described herein and the processor 205 is configured to execute the computer code.

The memory 210 is shown to include a feedback control module 215 and an adaptive control module 220. The memory may include a throttle plate position module 225 and an engine shutdown module 230. The feedback control module 215 is the primary logic module configured to provide the feedback-based control activity of the controller 155. In some embodiments, the feedback control module 215 is a proportional-integral-derivative (PID) control module. In other embodiments, the feedback control module 215 is a fuzzy logic control module. The feedback control module 215 uses information from the input interface 195 (e.g., detected engine speed) to calculate or otherwise obtain the controlled variable (e.g., throttle plate position). The feedback control module 215 may also use information stored in the memory 210 (e.g., previous detected engine speed, desired engine speed, etc.) in calculating or obtaining the controlled variable. The adaptive control module 220 is configured to determine appropriate values of control parameters (e.g., proportional gain, integral gain, derivative gain, etc.). The adaptive control module 220 may tune control parameters based on a model identification adaptive control (MIAC) approach or another adaptive tuning approach or algorithm.

The feedback control module 215 is configured to provide an engine speed control output based an engine speed error determined by a comparison of a current engine speed input from the engine speed sensor 160 with the desired engine speed. The output is provided to the motor 115 to adjust the throttle plate 125 position, thereby controlling the engine speed and correcting any engine speed error so that the detected engine speed and the desired engine speed are the same or substantially the same (e.g., within a predetermined range). The feedback control module can use different types of feedback control including PID control algorithms or fuzzy logic control rules. The adaptive control module 220 adjusts one or more parameters (e.g., coefficients, gains, rules, etc.) of the feedback control module 215 such that the feedback control module learns the appropriate operating parameters for a specific engine and end product (e.g., lawn mower, snow thrower, generator, pressure washer, etc.). For example, the feedback control module 215 may determine an engine speed error and provide an engine speed output intended to correct that error or a portion of the error (e.g., reduce the error by half). The adaptive control module 220 determines what an expected engine speed error correction is based on the output provided by the feedback control module 215. The adaptive control module 220 also determines an actual engine speed correction based on the current engine speed input from the engine speed sensor 160 and a previous engine speed input from the engine speed sensor 160. The adaptive control module 220 then is able to determine a correction error based on the expected engine speed error and the actual engine speed correction. In this way, the adaptive control module 220 is able to determine if the actual engine speed correction is the same as or close to the expected engine speed error correction (e.g., determine a correction error).

If the actual engine speed correction is not the same (or within a predetermined range acceptable as the same) as the expected engine speed correction, the adaptive control module 220 adjusts one or more parameters of the feedback control module 215. When the actual engine speed error correction was less than the expected engine error correction the parameter change is such that the subsequent attempt at correcting engine speed will be more aggressive. As used herein, more aggressive means that the position change of the throttle plate with adjusted parameter setting will be greater than at the previous parameter setting and less aggressive means that the position change of the throttle plate with adjusted parameter setting will be less than at the previous parameter setting. For example, in a controller 155 using PID control the adaptive control module 220 can change one or more of the proportional, integral and derivative parameters (e.g., coefficients or gains) of the feedback control module 215 to achieve the desired change in engine speed. The PID control of the feedback control module 215 may set forth a control algorithm to determine the motor adjustment—the amount of time voltage is supplied to the motor 115 (the duration or "width" of a voltage pulse). For example, the PID control algorithm may use the following equation to determine the motor adjustment where Error is the engine speed error.

$$\text{Motor Adjustment} = P_i \text{Error} + D_i \frac{d\text{Error}}{dt} + I_i \int \text{Error}$$

The adaptive control module 220 may be configured to adjust one or more of the proportional, integral and derivative parameters in response to a comparison of the actual change in engine speed following a throttle plate position adjustment (e.g., as measured by the engine speed sensor 160) with the expected change in engine speed following a throttle plate position adjustment (e.g., the engine speed error or a portion (e.g., one half, one third, etc.) of the engine speed error). If the actual change in engine speed is less than the expected change in engine speed, one or more of the parameters is adjusted to make the motor adjustment more aggressive (i.e., provide a voltage pulse of a longer duration). If the actual change in engine speed is greater than the expected change in engine speed, one or more of the parameters is adjusted to make the motor adjustment less aggressive (i.e., provide a voltage pulse of a shorter duration). The comparison of actual change in engine speed to the expected change in engine speed can be performed at a specific time (e.g., 2-3 engine cycles) after a motor adjustment pulse is sent to the motor 115. In some embodiments, the pulse of the motor adjustment has a duty cycle and the duty cycle of the pulse of the motor adjustment may be adjusted when the actual change in engine speed is different than the expected change in engine speed. In some embodiments, the motor adjustment algorithm In some embodiments using a PID control algorithm there are multiple parameter sets. For example, a first parameter set may be used when the throttle plate 125 is close or near to the closed position and a second parameter set may be used when the throttle plate 125 is close or near to the wide open position. This is helpful because the operating performance (e.g., speed) of the engine is not linear with respect to throttle plate position. When the throttle plate 125 is near the wide open position, the engine speed is not very responsive to changes in the throttle plate position and when the throttle plate 125 is near the closed position, the engine speed is more responsive to changes in the throttle plate position. Therefore, the parameter set associated with operation when the throttle plate 125 is near the closed position would be less aggressive than the parameter set that is used when the throttle plate 125 is near the wide open position. Two or more parameter sets based on the throttle position could be implemented. For example a curve could be fit so that the parameter sets used change from the closed position to the wide open position.

The adaptive control module 220 may also be configured to perform a comparison of the expected output (i.e., rotational speed) of the motor 115 from a particular duration of applied voltage (voltage pulse) to the back electromotive force ("back-EMF") actually caused by that particular duration of applied voltage. Back-EMF is caused by the rotation of the motor and can act as a proxy for a motor sensor for detecting the rotational speed of the motor. In this way the adaptive control module 220 allows the system to learn or adjust to the operational characteristics of a particular engine. Variations among particular engines (e.g., individual DC motors, the end use of the engine, etc.) will result in different duration voltage pulses being necessary to move a throttle plate a specific amount. For example, in one engine a voltage pulse of 10 milliseconds may move the throttle plate 10 degrees, but may only move the throttle plate of a second engine 5 degrees. The back-EMF correlation performed by the adaptive control module 220 allows the system to learn the particular voltage pulse duration needed for a particular throttle plate position change within the addition of a motor speed sensor and allows for that correlation to change as engine performance changes over the life of a particular engine. The back-EMF comparison can also be used to determine when the throttle plate 125 is at either end of its range of motion (i.e., closed position or wide open position) because the throttle plate 125 is at a hard stop at either end of its range of motion and the back-EMF should approach zero as the motor is unable to turn. The back-EMF comparison can also be used to identify variations between the operational characteristics of individual motors and a curve establishing a known or desired relationship between back-EMF and engine speed (e.g., RPM) and to determine the operational characteristics that need to be modified (e.g., duration of voltage pulses) to fit a specific motor to the known back-EMF and engine speed curve.

Figure 6:
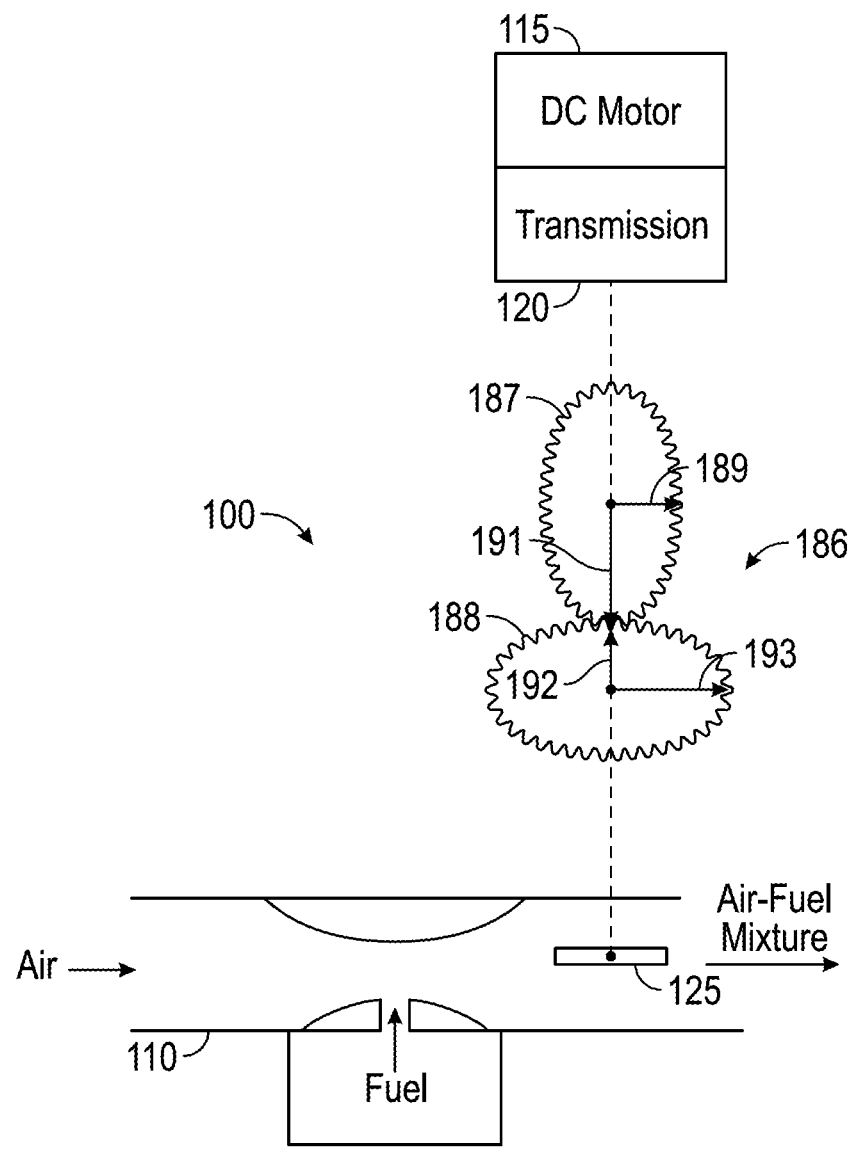
FIG. 6 is a schematic representation of a portion of an electronic governor system, according to an exemplary embodiment, with an elliptical gear set in a first operating position.
Figure 7:
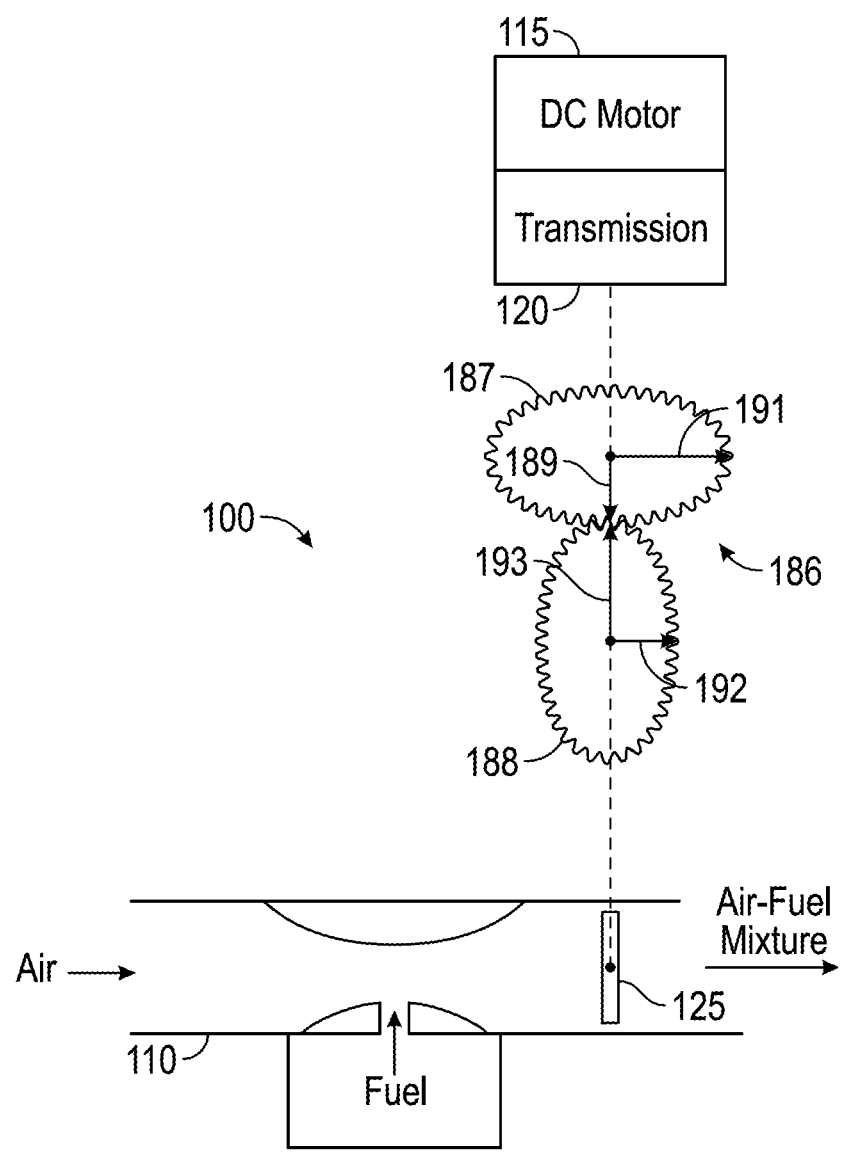
FIG. 7 is a schematic representation of the portion of the electronic governor system of FIG. 6 with the elliptical gear set in a second operating position.

As shown in FIGS. 6-7, in some embodiments of the electronic governor system 100, an elliptical gear set 186 is included between the transmission 120 and the throttle lever 130 to account for the non-linearity of engine speed with respect to throttle plate position. The elliptical gear set 186 includes two elliptical gears—a driving gear 187 and a driven gear 188. The driving gear 187 has a minor radius 189 that is less than a major radius 191. The driving gear 187 is coupled to or a component of the transmission 120. The driven gear 188 is coupled to the throttle plate 125 (e.g., directly or indirectly by one or more links or gears). The driven gear 188 has a minor radius 192 that is less than a major radius 193. The elliptical gear set 186 is arranged so that the driven gear 188 provides a relatively large amount of movement of the throttle plate 125 in response to specified amount of movement of the driving gear 187 when the throttle plate 125 is near the wide open position (FIG. 6) and so that the driven gear 188 provides a relatively small amount of movement of the throttle plate 125 in response to the same specified amount of movement of the driving gear 187 when the throttle plate 125 is near the closed position (FIG. 7). As shown in FIG. 6, when the throttle plate 125 is near the wide open position, the major radius 191 of the driving gear 187 engages the minor radius 192 of the driven gear 188. As shown in FIG. 7, when the throttle plate 125 is near the closed position, the minor radius 189 of the driving gear 187 engages the major radius 193 of the driven gear 188.

In embodiments where the feedback control module 215 uses a fuzzy logic control algorithm to control the output to the motor 115, a list of fuzzy logic rules is created to control the operation of the motor 115. These rules allow for non-linear control of the non-linear engine operation. In some embodiments, the temperature sensor 170 provides the detected temperature as an input to the fuzzy logic rule set.

In some embodiments the electronic governor system 100 includes a temperature sensor 170. The temperature sensor 170 is configured to detect a temperature (e.g., an ambient temperature, an engine temperature, or other appropriate temperature). The detected temperature is provided as an input to the controller 155 and may be utilized as an input to the various logic modules of the controller 155. As the engine may operate differently as relatively cold temperatures and relatively hot temperatures different control parameters (e.g., of the feedback control module 215 and/or the adaptive control module 220) can be used when the detected temperature is either below or above one or more thresholds (e.g. a hot operating condition threshold and a cold operating condition threshold).

The memory 210 may also include a throttle plate position module 225. The throttle plate position module 225 is configured to determine the position of the throttle plate 125 based on tracking the expected changes in the throttle plate position from an initial throttle plate position. The initial throttle plate position is known. For example, the wide open position may be considered to be 90° and the closed position may be considered to be 0°. Based on that starting position (e.g., the wide open position), the throttle plate position module 225 calculates a current throttle plate position based on the changes to the throttle plate position caused by the motor 115. The product of the voltage applied to the motor 115 and the amount of time for which that voltage is supplied corresponds to an expected change in the position of the throttle plate 125. By keeping track of all expected movements of the throttle plate 125 from the initial known position caused by operation of the motor 115, the throttle plate position module 225 is able to track the position of the throttle plate 125. Alternatively, an encoder (e.g., the encoder 150) may keep track of the throttle plate position. However, an encoder adds cost that may not be necessary for the electronic governor system 100 to operate as desired.

The engine 105 includes an ignition system 180. In some embodiments excess energy from the ignition system 180 is used to power the motor 115 and/or the controller 155. In this way the electronic governor system 100 is able to operate without a separate or dedicated power supply (e.g., a separate battery or the battery used to power an electric engine starting system). In a magneto or spark ignition system extra energy in the form of ignition sparks or pulses can be harvested and stored in a capacitor or other energy storage device (e.g., battery) for use to power the motor 115. Though a spark based ignition system is discussed as an example other types of ignition systems are possible. The excess energy of the ignition system may also be sufficient to power the motor 115 and/or the controller 155. After the engine 105 is started, there is a relatively abundant amount of excess energy that can be harvested to power the electronic governor system 100. For example, the energy from the two positive pulses or sparks of a four-cycle magneto ignition system can yield about one amp of current. Other types of ignition systems also provide waste energy that could be harvested to power the electronic governor system. In a four-cycle magneto ignition system there is a waste spark on the exhaust stroke of the cylinder. In such a system, the two positive pulses or sparks and the waste negative pulse or spark could all be harvested. In some embodiments, other power supplies that do not include a separate or dedicated power supply (e.g., a separate battery) may be used to power the motor 115 and/or the controller 155. Alternative power supplies include an alternator driven by the engine 105, a thermoelectric power generator that makes use of waste heat from the engine 105, a piezoelectric power generator driven by vibrations of the engine 105 and/or the outdoor power equipment driven by the engine 105, a Faraday power generator including a magnet oscillating within a coil driven in sync with the reciprocating movement of the piston of the engine 105. In some embodiments, an energy storage device (e.g., a rechargeable battery, a capacitor, etc.) is provided to store the energy produced by the power supplies described above. In this way, power is available for the motor 115 and/or the controller 155 when the engine 105 is initially started and there is not an immediately available supply of energy to be harvested from the operating engine 105.

A rev limiter 185 may be provided to prevent the engine 105 from achieving an overspeed condition in which the engine speed exceeds a threshold (e.g., a redline). The rev limiter 185 detects the engine speed and when the engine speed exceeds the threshold, shorts the ignition to prevent the engine from continuing to exceed the speed threshold. To make the reduction in speed associated with shorting the ignition smoother (e.g., less sudden and/or less noisy to the operator), it may be preferable to short a subset of the ignition sparks rather than all of the engine sparks. Shorting all of the ignition events (e.g., sparks associated with combustion events) would have an audible effect and the engine speed would abruptly drop. Shorting fewer than 100% of the ignition events (e.g., every second, third, fourth, etc. ignition event) would slow the engine speed but be less abrupt and less noticeable audibly to the user.

A user interface 165 may be provided so that the user is able to control the desired speed (e.g., expected or targeted speed) of the engine 105. This user interface 165 could be an analog input such as a voltage divider, a fixed resistor, a variable resister (e.g., a potentiometer or sliding variable resistor). In some embodiments where the engine was used to power a wheel drive train (e.g., on a riding or walk behind lawn mower or snow thrower) a throttle input (e.g., a gas pedal or lever) may be moved to adjust the analog input and therefore adjust the desired speed of the engine. If the engine is used to power a generator, a discreet two-position analog input could be used to switch the output frequency of the electricity provided by the generator between the 60 Hz electricity used in the United States and Canada, and the 50 Hz electricity used elsewhere in the rest of the world (e.g., Europe and Asia). Other discreet control modes, for example, could include a quiet operating mode versus a power operating mode. The quiet operating mode may be configured so that the engine runs at a relatively low speed (e.g., 2,400 rpm) versus the power mode which runs at a relatively high rpm (e.g., 3,000 rpm). In some embodiments, the user interface is wireless RF, infrared IR, and LED or light pulse interface or capacitive sensing interface (e.g., a touchscreen). In some embodiments the user interface 165 includes a second microcontroller. For example, a touch screen or other interface device could provide inputs to a second controller which provide a variable voltage output to the controller operating the electronic governor system. In some embodiments, the user interface 165 provides a digital input.

Initial performance characteristics of the engine governor system 100 can also be varied (e.g., more or less aggressive engine speed error correction. These characteristic settings could be preset when the system or engine is assembled (e.g., by setting a specific resistance or voltage value). For example one setting could be used with relatively low inertia equipment driven by the engine (e.g., the pump of a pressure washer) and a second setting could be used with relatively high inertia equipment driven by the engine (e.g., the blade of a lawn mower). This provides the controller 155 with some initial performance characteristics (e.g., the relative inertia of the equipment being driven) before it has even had a chance to start adapting the control parameters based on the actual use of the engine. For example, 1000-4000 rpm could be selected with input resistances of 100-400 ohms and with input resistances of 1100-1400 ohms with settings of 100-400 ohms providing moderately aggressive performance for relative low inertia applications and 1100-1400 ohms providing more aggressive performance for relatively high inertia applications. Additionally, there could also be more than two performance characteristics settings (e.g., low inertia, moderately low inertia, moderate inertia, moderately high inertia, high inertia, etc.) that could be selected based on engine type (e.g., size, number of cylinders, rated horsepower, rated torque) and equipment to be driven by the engine. Alternatively, the performance characteristic settings could be tied to the voltages that will be read by the controller 155.

A current sensor 175 may be included to monitor the current draw on the motor 115. For example, a shunt resistor may be used to measure this motor current. The current sensor 175 is used to detect potential failures in the electronic governor system 100 and shut down the engine 105 (e.g., stop the engine) in response to detecting such a failure. For example, a detected current above a high current threshold could indicate a jam, obstruction, the end of travel, a motor short, or some other situation in which the motor 115, the transmission 120, the throttle plate 125, the throttle lever 130, the linkage 135, or other movable component is unable to move (e.g., rotate, translate, etc.) as desired. When the current sensor 175 detects a current below a low current threshold this could indicate a broken wire or some other loss of electrical communication between the components of the electronic governor system 100. Both a high current above the high threshold and a low current below the low threshold may be indicative of situations in which the engine 105 should be stopped or shut down to prevent possible damage to the engine. Engine shutdown module 230 is configured to shut down, stop, turn off, or deactivate the engine in response to an appropriate input (e.g., release of a safety interlock, like when the bail of a walk-behind lawn mower is released, movement of an on/off switch to the off position, etc.). Engine shutdown module 230 may receive an input from the current sensor 172 and shut off the engine in response to low current or high current as described above.

In some embodiments, the engine speed sensor 160 detects the engine speed using an ignition signal from the ignition system 180. For example, the positive sparks or pulses from the ignition system could be counted and used to determine the engine speed. This method of determining engine speed provides an additional advantage when shorting the negative pulses or sparks with the rev limiter 185. The engine speed detection, which is determined from the positive pulses, is not lost when slowing down the engine 105 with the rev limiter 185 by shorting the negative pulses or sparks. In other embodiments, other appropriate engine speed sensors are utilized.

The electronic governor systems described herein are able to adjust the operating speed of the engine in response to an input from a load sensing system. Combining a load sensing system with the electronic governor systems allows the operating speed of the engine to be optimized for various load conditions. For example, an engine including an electronic governor system and a load sensing system as described herein could operate in one of two modes: a no load or low load mode (e.g., when the blade of a lawn mower is not cutting any grass) where the engine operates at an idle or relatively low speed and a high load mode (e.g., when the blade of the lawn mower is cutting grass) where the engine operates at an high operating or relatively high speed. More complex systems allow for additional modes of operation for example a moderate load mode (e.g., when the blade of the lawn mower is cutting grass that is thinner than that being cut in the high load mode) where the engine operates at a speed between the idle speed and the high operating speed. The engine speed could also vary continuously with load or approximately continuously with load (e.g., with a step-function or other appropriate curve fit). For example, the engine speed could be controlled to always fit within a band or window defined by a high engine speed curve and a low engine speed curve and operate in a manner similar to a continuously variable transmission.

The load sensing system makes use of the principle of rotational motion that the sum of the torques for the system equals zero. The sum of the torques is equal to inertia times the change in angular velocity as shown in the equation below. The $\text{Torque}_{Produced}$ is the torque produced from combustion by the engine and the $\text{Torque}_{Load/Losses}$ is the torque produced from the load on the engine (e.g., mower blade, pressure washer pump, drive system, etc.) and any losses within the engine (e.g., friction, gas compression, vacuum, etc.)

$$J\ddot{\theta} = \text{Torque}_{Produced} - \text{Torque}_{Load/Losses}$$

In a first load sensing system for a single cylinder four-cycle engine, the load can be estimated by comparing the rotational speed of the engine for two consecutive engine revolutions. A "fast" revolution occurs during the expansion and exhaust cycles of the engine. A "slow" revolution occurs during the intake and compression cycles of the engine. The difference in revolution speed (e.g., in revolutions per minute ("RPM")) is a function of the $\text{Torque}_{Load/Losses}$ and inertia. When the inertia is known (e.g., the inertia of a specific end use of the engine, for example for a specific lawn mower, pressure washer, tractor, or other piece of outdoor power equipment), then the difference in revolution speed from the fast revolution to the slow revolution (e.g., RPM of the fast revolution minus the RPM of the slow revolution) is a function of the $\text{Torque}_{Load/Losses}$. By calculating this difference, the load sensing system can accurately estimate the load on the engine. The load can then be used as an input to the electronic governing system to control the speed of the engine.

In a second load sensing system for a single cylinder four-cycle engine, the load can be estimated by comparing the rotational speed of the engine for each of the four cycles. The sum of the torques for each of the four cycles (expansion, compression, intake, and compression) can be calculated according to the equation shown below.

$$J\ddot{\theta} = \text{Torque}_{Produced} - \text{Torque}_{Loss} - \text{Torque}_{Load}$$

Using four versions of this equation, one for each cycle, with the inertia remaining constant for all four equations, the load sensing system is able to determine the load based on the measured change in engine speed from one cycle to the next because each of the four equations is left with only one unknown (four equations with four unknowns are solvable). For the expansion cycle, $\text{Torque}_{Loss}$ is negligible and can be assumed to be zero. For the exhaust cycle, $\text{Torque}_{Produced}$ and $\text{Torque}_{Loss}$ are negligible and can be assumed to be zero. For the intake cycle, $\text{Torque}_{Produced}$ and $\text{Torque}_{Loss}$ are negligible and can be assumed to be zero. For the compression cycle, $\text{Torque}_{Produced}$ is negligible and can be assumed to be zero.

The combustion process can vary from combustion cycle. The combustion process regularly experiences "bumps" or "pops" due to many possible factors including fuel quality, air availability, variations in the fuel-air ration, etc. Either of the two load sensing systems described above can reduce the impact of these combustion process variations, which may result in variations of the engine speed, which is the inputs to the calculations used to determine the load for both systems, by using a running average and/or a standard deviation of the engine speed measurements.

The average load value can be calculated using the equation below. "A" is a factor used to weigh the average load value. The value of A may be selected based on the intended end use of the engine (e.g., lawn mower, pressure washer, tractor, or other piece of outdoor power equipment) and the desired engine performance for that engine. As the value of A increases, the average load value becomes smoother, but it delays response time for true changes in load, rather than momentary chances due to combustion variations.

$$\text{Avg. Load Value} = \frac{(\text{Avg. Load Value} * A + \text{New Load Value})}{A + 1}$$

The average load value can be used as the trigger to change between operating modes of the electronic governing system. For example for the two operating mode electronic governing system discussed above, the no load operating mode can be triggered when the average load value is at or below a predetermined threshold value and the high load operating mode can be triggered when the average load value is at or above a predetermined threshold value. To avoid hunting or hysteresis between the two modes, the predetermined threshold values can be different for the no load operating mode and the high load operating mode. For example, the no load threshold value could be an average load value of 15 and the high load threshold value could be 20, providing a window between 15 and 20 where mode hunting is avoided. Alternatively a percentage change threshold (e.g., 20%) in average load value could be used as the trigger to change between operating modes of the electronic governing system. The threshold values, whether absolute or a percentage, can be tied to specific engine sizes and end products. Another way to avoid mode hunting is to include a minimum predetermined time period between operating mode changes. For example, each operating mode could be required to run for at least 5 seconds before be able to switch based on the current average load value. A standard deviation of the load value could be used in similar manners on its own or in combination with the average load value to provide a trigger to change between operating modes of the electronic governing system. The standard deviation of the measured engine speed may also be used to distinguish between an actual change in engine speed (e.g., due to an increased or decreased load on the engine) and intermittent variations in engine speed due to combustion irregularities. Measured engine speed includes expected variations on a per-cycle basis. The expansion (combustion, power) cycle has a faster engine speed than the intake, compression, and exhaust cycles. The standard deviation accounts for the expected variations on a per-cycle basis so that only engine speed changes in excess of the standard deviation, or in excess of the standard deviation modified by an error factor (e.g., multiplied or added to the standard deviation), are used to trigger a change in throttle plate position by the engine governing system.

Both load sensing systems make use of an appropriate controller to implement the control schemes discussed above and of an appropriate engine speed sensor to detect the engine speed for use as an input as discussed above. Possible engine speed sensors include a magnetic field sensor (e.g., a Hall Effect sensor or reed switch) in combination with a magnet on the flywheel. The magnet on the flywheel could be the same used to generate the spark for the ignition system, but could also be a separate second magnet. Both load sensing systems could also include an operating mode input to provide a verification that the detected change in load based on the engine speed calculations as an intended change in load based on the user's intended operating mode. For example, a tilt sensor could indicate when the front wheels of a walk behind lawn mower are lifted off the ground, thereby confirming a reduced load. A switch on the bail of walk behind lawn mower could indicate when the operator engages the drive system. A vacuum sensor could detect changes in engine vacuum as a redundant check on load changes.

A user-actuated switch could also be used as a feedforward input to the load sensing system. For example, a switch actuated by a user operated lever (e.g., the bail of a walk-behind mower, the trigger of a pressure washer spray gun, a control lever of a snowthrower, a power takeoff engage switch on a riding tractor, etc.) would indicate an expected engine load to the load sensing system (e.g., operation of the tool driven by the engine, a load on the tool driven by the engine, engagement of a drive train, etc.). The load sensing system could use this feedforward input to override or supplement the load output provided by the load sensing system.

The same controller or separate controllers can be used to implement the controls schemes used by the electronic governor system and by the load sensing system. For example, as shown in FIG. 2, the controller 155 could be used to control both the electronic governor system 100 and a load sensing system as described above via a load sensing module 235 configured to implement a load sensing system as described herein. The engine speed sensor 160 could be used to provide the necessary engine speed inputs to the load sensing module 235 to implement the load sensing system.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An electronic governor system, comprising:
   a motor;
   a transmission coupled to the motor;
   a throttle plate coupled to the transmission, the throttle plate movable to a plurality of positions between closed and wide-open;
   an engine speed sensor; and
   a controller including a feedback control module and an adaptive control module;
   wherein the feedback control module is configured to:
      determine an engine speed error based on a comparison of a current engine speed input signal from the engine speed sensor and a desired engine speed; and
      provide an engine speed output signal to the motor to control the position of the throttle plate to correct the engine speed error, wherein the engine speed output signal is determined by a control algorithm using the engine speed error as an input;
   wherein the adaptive control module is configured to:
      determine an expected engine speed error correction based on the engine speed output signal provided by the feedback control module;
      determine an actual engine speed error correction based on a current engine speed input signal from the engine speed sensor and a previous engine speed input signal from the engine speed sensor;
      determine a correction error based on the expected engine speed error correction and the actual engine speed correction; and
      adjust a parameter of the control algorithm of the feedback control module when the correction error is within a predetermined range or outside of a predetermined range.

2. The electronic governor system of claim 1, wherein the feedback control module utilizes a proportional-integral-derivative control algorithm to provide the engine speed output signal and the parameter adjusted by the adaptive control module is at least one of a proportional parameter, an integral parameter, and a derivative parameter.

3. The electronic governor system of claim 2, wherein the proportional-integral-derivative control algorithm utilizes a plurality of parameter sets, each parameter set including a proportional parameter, an integral parameter, and a derivative parameter, and wherein the feedback control module is configured to utilize a specific parameter set based on the position of the throttle plate.

4. The electronic governor system of claim 3, wherein a first parameter set is utilized by the proportional-integral-derivative control algorithm when the throttle plate is near the closed position and a second parameter set is utilized by the proportional-integral-derivative control algorithm when the throttle plate is near the wide-open position.

5. The electronic governor system of claim 3, further comprising a temperature sensor configured to detect a temperature, wherein a first parameter set is utilized by the proportional-integral-derivative control algorithm when the detected temperature is below a threshold and a second parameter set is utilized by the proportional-integral-derivative control algorithm when the detected temperature is above the threshold.

6. The electronic governor system of claim 2, further comprising a temperature sensor configured to detect a temperature, wherein the detected temperature is an input to the fuzzy logic control algorithm.

7. The electronic governor system of claim 1, wherein the feedback control module utilizes a fuzzy logic control algorithm to provide the engine speed output signal and wherein the parameter adjusted by the adaptive control module is at least one parameter of at least one rule of the fuzzy logic control algorithm.

8. The electronic governor system of claim 1, further comprising an ignition system, wherein excess energy from the ignition system is used to power the motor.

9. The electronic governor system of claim 1, wherein power is not supplied to the motor when the throttle plate position is not changing.

10. The electronic governor system of claim 1, wherein the adaptive control module is configured to adjust a parameter of the feedback control module such that a subsequent engine speed output signal is more aggressive when the expected engine speed error correction is less than the actual engine speed correction.

11. The electronic governor system of claim 1, wherein the adaptive control module is configured to adjust a parameter of the feedback control module such that a subsequent engine speed output signal is less aggressive when the expected engine speed error correction is greater than the actual engine speed correction.

* * * * *